US008659770B2

United States Patent
Okamoto et al.

(10) Patent No.: US 8,659,770 B2
(45) Date of Patent: Feb. 25, 2014

(54) IMAGE FORMING DEVICE, IMAGE FORMING SYSTEM AND COMPUTER READABLE MEDIUM WITH STATE OF SECURITY LEVEL NOTIFICATION

(75) Inventors: Akira Okamoto, Saitama (JP); Akihide Oshima, Saitama (JP); Eiji Shimoichi, Saitama (JP); Yuriko Inakawa, Saitama (JP); Eiji Nishi, Saitama (JP); Noriyuki Tatsuma, Saitama (JP); Takanari Ishimura, Saitama (JP); Yoshiyuki Yoda, Saitama (JP); Masaki Kurokawa, Saitama (JP); Atsuhiro Itoh, Saitama (JP); Fumio Harada, Saitama (JP)

(73) Assignee: Fuji Xerox Co., Ltd., Tokyo (JP)

(*) Notice: Subject to any disclaimer, the term of this patent is extended or adjusted under 35 U.S.C. 154(b) by 1642 days.

(21) Appl. No.: 12/134,356

(22) Filed: Jun. 6, 2008

(65) Prior Publication Data

US 2009/0091782 A1  Apr. 9, 2009

(30) Foreign Application Priority Data

Oct. 3, 2007  (JP) ................................ 2007-260315

(51) Int. Cl.
    *G06F 3/12* (2006.01)
(52) U.S. Cl.
    USPC ........................... 358/1.15; 358/1.13; 358/1.1
(58) Field of Classification Search
    USPC ......................................... 358/1.15, 1.1, 1.13
    See application file for complete search history.

(56) References Cited

U.S. PATENT DOCUMENTS

| 5,475,839 | A | * | 12/1995 | Watson et al. ..................... 713/2 |
| 5,864,666 | A | * | 1/1999 | Shrader ........................... 726/15 |
| 5,956,487 | A | * | 9/1999 | Venkatraman et al. ........ 709/218 |
| 7,676,585 | B1 | * | 3/2010 | Francke et al. ............... 709/229 |
| 2002/0078202 | A1 | * | 6/2002 | Ando et al. .................... 709/225 |
| 2003/0154404 | A1 | * | 8/2003 | Beadles et al. ................ 713/201 |

FOREIGN PATENT DOCUMENTS

| JP | 2003-283738 A | 10/2003 |
| JP | 2004-005030 A | 1/2004 |
| JP | 2004-102525 A | 4/2004 |
| JP | 2005-190348 A | 7/2005 |
| JP | 2006-190348 A | 7/2006 |
| JP | 2006-209198 A | 8/2006 |
| JP | 2006-246407 A | 9/2006 |
| JP | 2006-270414 A | 10/2006 |
| JP | 2006-324853 A | 11/2006 |
| JP | 2007-066172 A | 3/2007 |

OTHER PUBLICATIONS

Ochiai Masashito, Network Device, its Control Method, and Computer Program, Jan. 8, 2004, JP 2004005030 A.*

(Continued)

*Primary Examiner* — Benny Q Tieu
*Assistant Examiner* — Martin Mushambo
(74) *Attorney, Agent, or Firm* — Sughrue Mion, PLLC

(57) ABSTRACT

An image forming device includes an image forming section, a connection section, a request receiving section, an illegality detection section, a notice section and a web page creation section. The image forming section performs image formation on a medium. The connection section communicates with an information processing device. The request receiving section receives a request from the information processing device through the connection section. The illegality detection section detects an illegal access to the request receiving section through the connection section. The notice section notifies, to the information processing device, a detection result by the illegality detection section through the connection section.

19 Claims, 18 Drawing Sheets

(56) References Cited

OTHER PUBLICATIONS

Tanimoto Yoshifumi, Communication Device and its Program, 20061130, JP 2006324853 A.*

Office Action issued in counterpart Japanese Application No. 2007-260315 dated Dec. 1, 2010.
Office Communication dated Jan. 21, 2010 issued by the Japanese Patent Office in counterpart application No. 2007-260315.

* cited by examiner

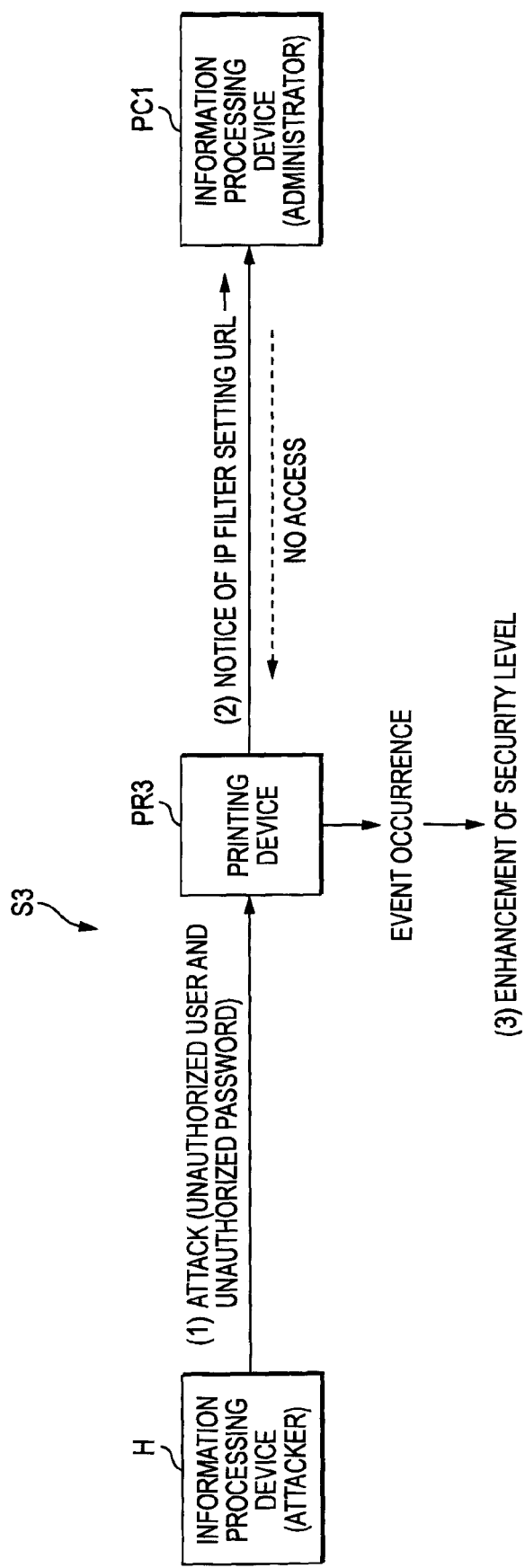

IMAGE FORMING DEVICE, IMAGE FORMING SYSTEM AND COMPUTER READABLE MEDIUM WITH STATE OF SECURITY LEVEL NOTIFICATION

CROSS-REFERENCE TO RELATED APPLICATIONS

This application is based on and claims priority under 35 USC 119 from Japanese Patent Application No. 2007-260315 filed Oct. 3, 2007.

BACKGROUND

1. Technical Field

The present invention relates to an image forming device, an image forming system and a computer readable medium.

2. Related Art

Into a recent printing device (printer) as one of image forming devices, an embedded web server (hereinafter referred to as EWS) as a request receiving section is frequently incorporated in order to perform various settings relating to printing.

The EWS incorporated into the printing device is accessed through a browser (web browser) installed in an information processing device such as a personal computer connected to the printing device through a network such as LAN or Internet, and various settings are performed on a web page (HTML page) displayed on a monitor of the information processing device.

Here, the web browser means application soft for browsing a web page. For example, an HTML file or an image file may be downloaded by the browser through the Internet, and the browser may analyze layout of its file, thereby to perform processing such as display or reproduction.

However, when the web page for performing the various setting of the printing device on this EMS as described above is opened to the public on the network, there is fear that a malicious third person may perform an illegal operation through this network by means of an information processing device that the malicious third person is operating.

Specifically, when the third person has known URL (Uniform Resource Locator) of the web page, there is fear that he may gain access to the URL from the browser of the information processing device and may change illegally printing device settings through the web page.

Further, when a memory device (flash memory or hard disc device) is incorporated into the printing device, and stores personal information such as a user's name and electronic mail address, there is also risk that these personal information may leak due to the above illegal access.

In order to secure security of the EWS incorporated into such the printing device, various technologies have been proposed.

SUMMARY

According to an aspect of the invention, an image forming device includes an image forming section, a connection section, a request receiving section, an illegality detection section, a notice section and a web page creation section. The image forming section performs image formation on a medium. The connection section communicates with a information processing device. The request receiving section receives a request from the information processing device through the connection section. The request receiving section is an embedded web server which allows an access from the information processing device through the connection section. The illegality detection section detects an illegal access to the request receiving section through the connection section. The notice section notifies, to the information processing device, a detection result by the illegality detection section through the connection section. The web page creation section creates a web page which is put on line by an embedded web server and includes certain information. The notice section transmits URL of the web page created by the web page creation section through the connection section to the information processing device by using one of an electronic mail, SNMP-trap, a certain protocol.

BRIEF DESCRIPTION OF THE DRAWINGS

Exemplary embodiments of the present invention will be described in detail based on the following figures, wherein:

FIG. 18 is an explanatory view showing an operation of the image forming system S3.

DETAILED DESCRIPTION

Figure 1:
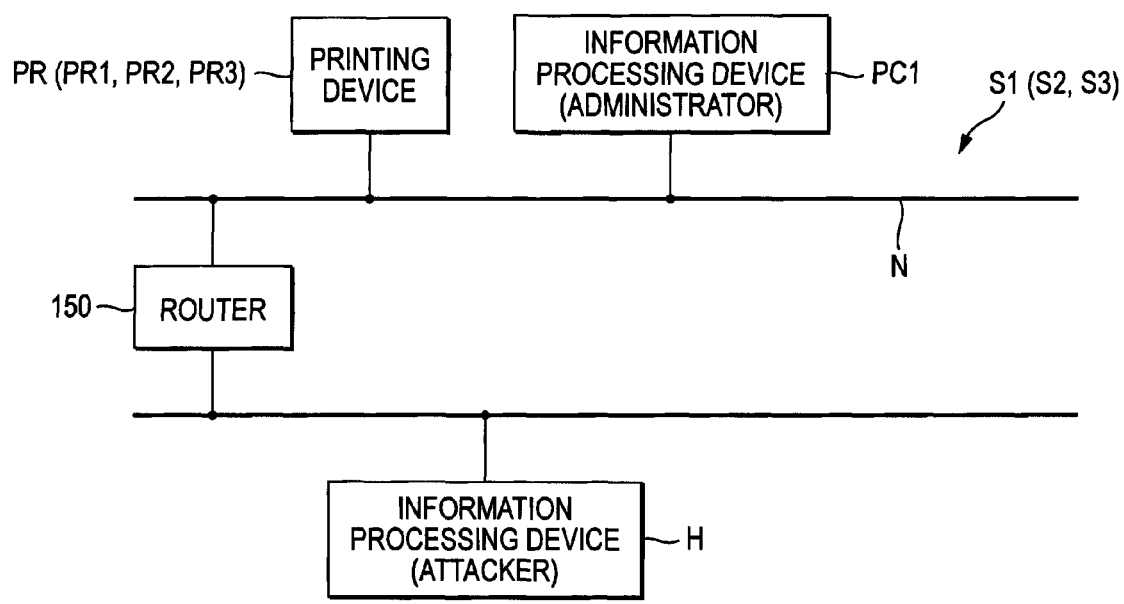
FIG. 1 is a block diagram showing the configuration of an image forming system S1 (S2, S3) according to first to third exemplary embodiments.

Exemplary embodiments as examples of the invention will be described in detail with reference to drawings. Here, in the accompanying drawings, the same members are denoted by the same reference characters, and their overlapped description is omitted.

With reference to FIGS. 1 to 6, an image forming system S1 and a printing device PR1 according to a first exemplary embodiment of the invention will be described.

FIG. 1 is a block diagram showing the configuration of the image forming system S1 according to the first exemplary embodiment.

As shown in FIG. 1, the image forming system S1 includes the printing device PR1 as a kind of image forming devices, an information processing device PC1 for an administrator which is constituted by a personal computer, an information processing device H for an attacker on the printing device PR1, and a router 150 that connects networks N such as LAN or Internet, which are connected through the networks N.

Although a case where one printing device PR, one information processing device PC1, and one information processing device H are connected is indicated in the exemplary embodiment, the invention is not limited to this case, but two or more devices PR, PC1, H may be connected. In addition, an image input device (scanner) having a network function may be connected.

Further, in the exemplary embodiment, the kind of printing device PR1 is not particularly limited, but may be any of a laser printer, a full-color printer, an ink jet printer, a scanner, and a multi function device.

Figure 2:
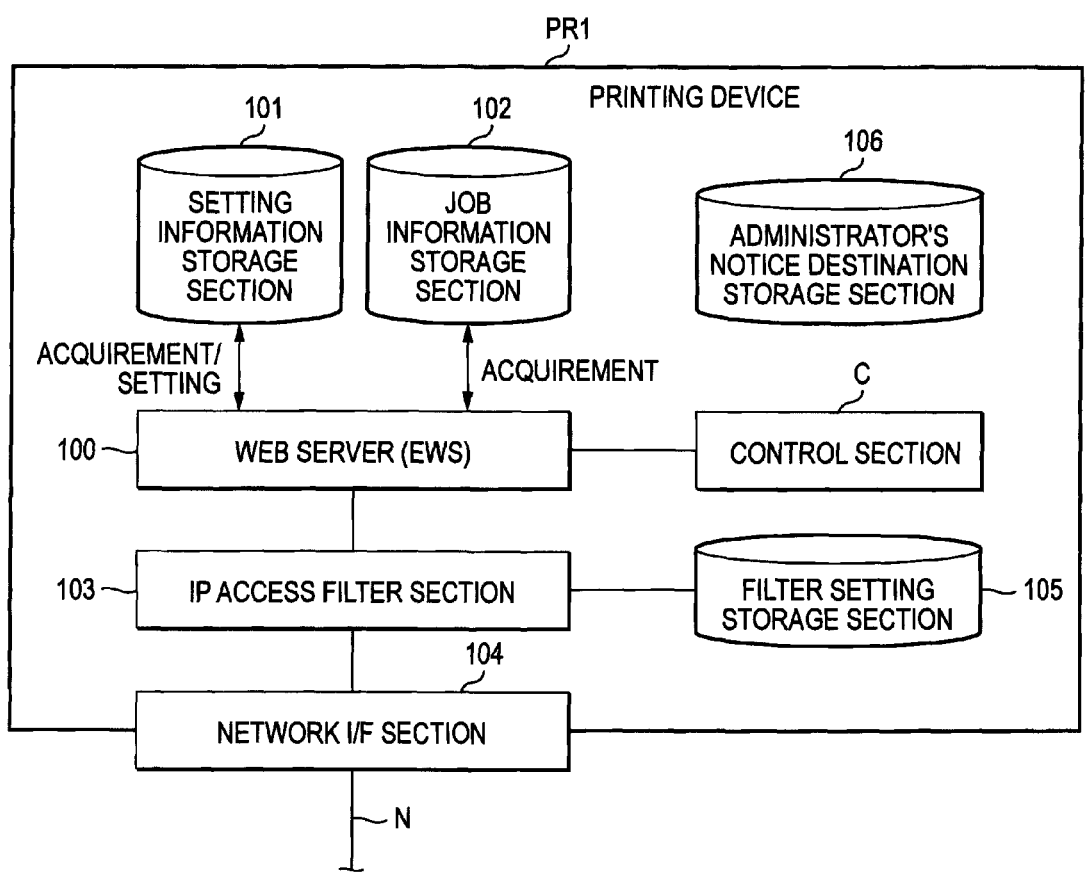
FIG. 2 is a block diagram showing a functional configuration of a printing device PR1.

Next, with reference to a block diagram in FIG. 2, the configuration of the printing device PR1 related to the invention will be described. Regarding the configuration related little to the invention, its illustration and description are omitted.

The printing device PR1 includes a control section C which includes a microcomputer and controls the entirety of the device; an embedded web server (hereinafter, referred to as EMS) 100 as a request receiving section which performs various setting of the printing device PR1 itself, displays setting information, and displays printing job information, a setting information storage section 101 which stores various setting (setting of paper size, setting of resolution, setting of density, setting of two-sided printing, and setting of a staple) of the printing device PR1 itself; a job information storage section 102 which stores a printing job; an IP access filter section 103 which sets, for a given IP address, a filter for permission and rejection of access to the EWS 100; a network interface section 104 which performs communication with the network N; a filter setting storage section 105 which stores setting of the filter; and an administrator's notice destination storage section 106 which stores electronic mail address of an administration and the like.

Next, a procedure of security setting change processing executed by the thus constructed image forming system S1 will be described with reference to a flowchart of FIG. 3 and an explanatory diagram of FIG. 4.

When this processing is started, first, whether illegal access has been detected is judged by control of the control section C in a step S100. In case of "No", the processing waits as it is; and in case of "Yes", the processing proceeds to a step S101 (refer to (1) in FIG. 4).

Here, though the detection of the illegal access is not particularly limited, it may be performed on the basis of input of an unauthorized password.

In the step S101, the printing device PR1 creates a setting page (web page) of the IP access filter, and thereafter, the processing proceeds to a step S102.

Figure 4:
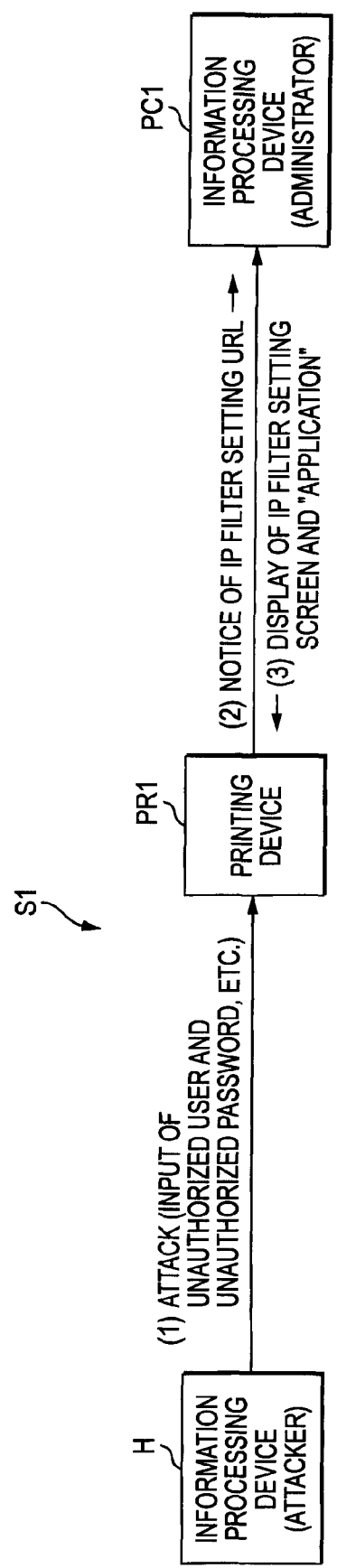
FIG. 4 is an explanatory view showing an operation of the image forming system S1.

In the step S102, the printing device PR1 transmits URL (Uniform Resource Locator) of the setting page of the IP access filter to the administrator's information processing device PC (refer to (2) in FIG. 4).

This URL transmission may be performed by any of an electronic mail, SNMP-trap and a given protocol.

Next, in a step S103, a link to the setting page of the IP access filter is added to and displayed on a top page of the EWS 100 of the printing device PR1.

In a step S104, the administrator operates a web browser of the information processing device PC1, thereby to gain access to the notified URL and open the setting page of the IP access filter (refer to (3) in FIG. 4).

Figure 5:
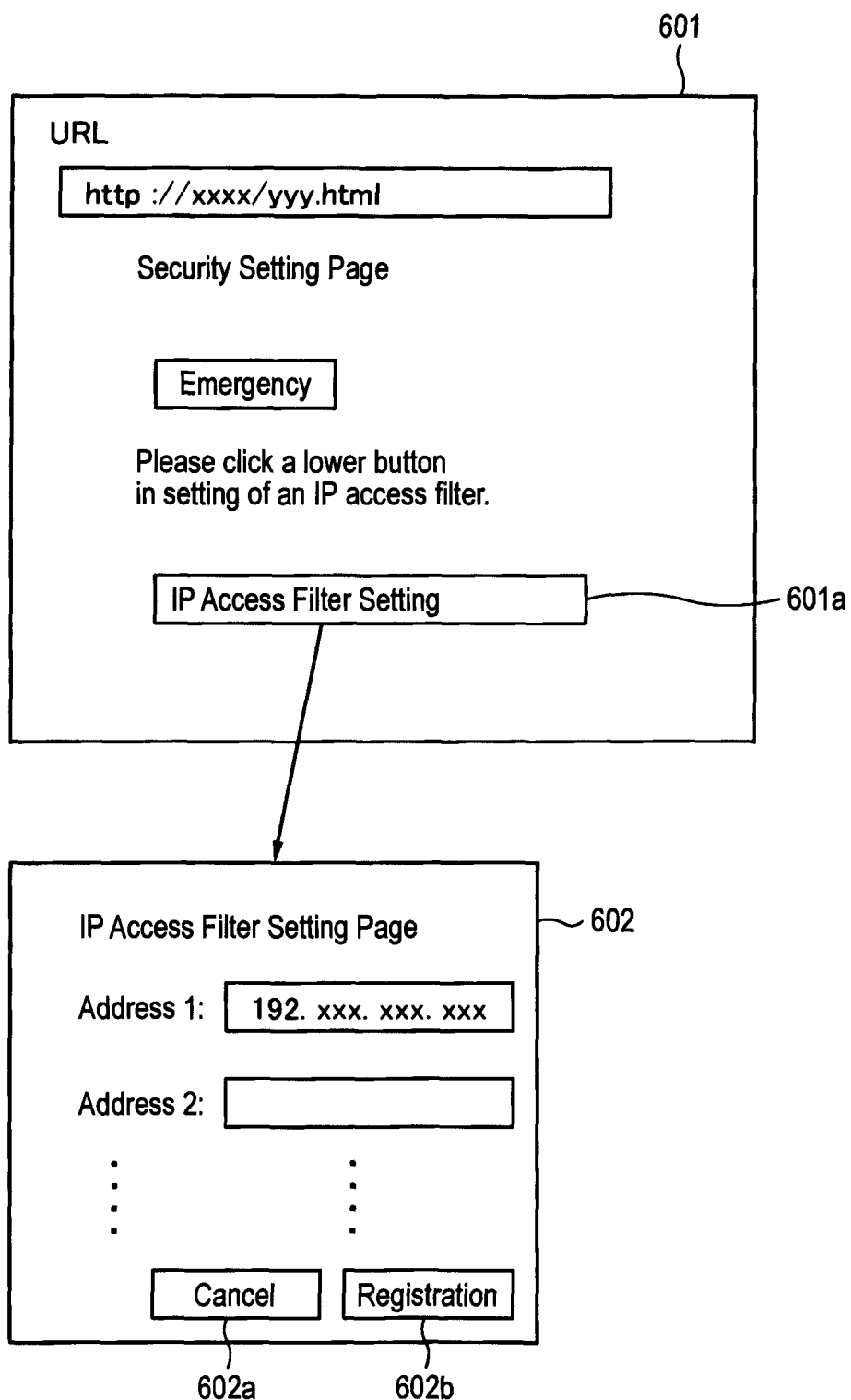
FIG. 5 is an explanatory view showing a constitutional example of a security setting page in the image forming system S1.

A constitutional example of the setting page of the IP access filter and an operation example are shown in FIG. 5.

A page 601 in FIG. 5 indicates a state where the link to the setting page of the IP access filter is added to and displayed on the top page of the EWS 100. In this example, the link to the setting page of the IP access filter is set in a button display 601a indicating "IP access filter setting".

Here, the administrator, in case that he judges setting of the IP access filter to be necessary, clicks the button display 601a by mouse operation.

Hereby, an IP access filter setting page 602 is opened, and the administrator inputs "attacker's IP address" notified separately by an electronic mail by operating a keyboard.

In the example of FIG. 5, assuming that two or more attackers exist, by inputting two or more IP addresses, a filter may be set for each address.

Figure 3:
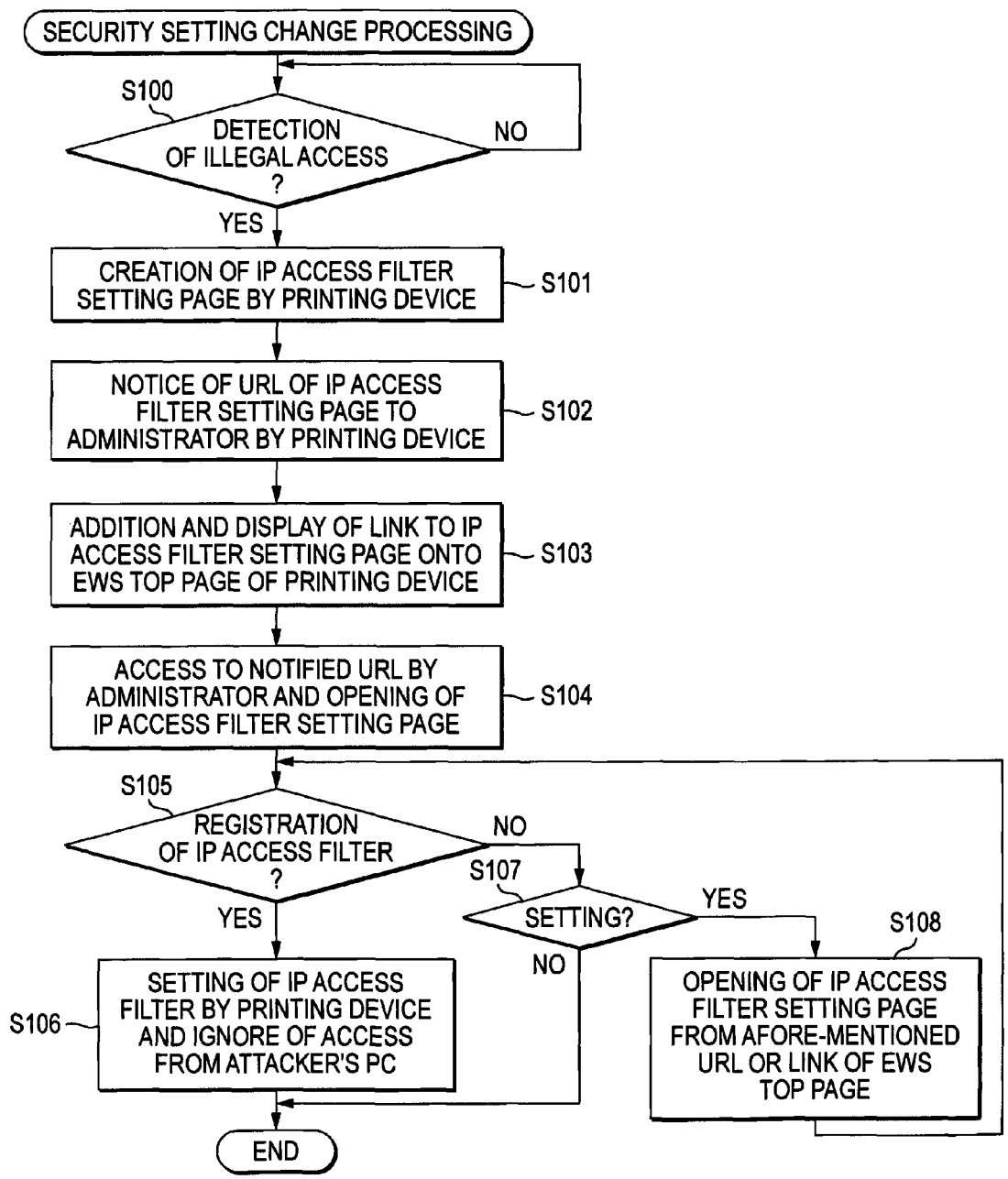
FIG. 3 is a flowchart showing a procedure of security setting change processing executed by the image forming system S1.

Next, in a step S105 in the flowchart of FIG. 3, whether the IP access filter is set or not is judged. In case of "No" (in the example of FIG. 5, in case that setting is stopped by judgment of the administrator and a "cancel" button 602a is clicked), the processing proceeds to a step S107.

Further, in case of "Yes" (in the example of FIG. 5, in case that the "attacker's IP address" is input as described above based on the administrator's judgment, and a "registration" button 602b is clicked), the processing proceeds to a step S106.

In the step 106, the control section C of the printing device PR1, on the basis of the setting contents of the IP access filter, sets a filter for the "attacker's IP address". And the access to the EWS 100 from the attacker's information processing device H is hereinafter ignored.

Hereby, security of the printing device PR1 is improved, so that illegal change of setting and leakage of personal information such as administrator's e-mail address can be prevented.

Further, steps S107 and S108 are compensative functions which allow the setting when the administrator thinks that setting of the IP access filter is necessary after he has judged the circumstances.

In the above example, the administrator judges the circumstances and performs setting of the IP access filter on the IP access filter setting page as shown in FIG. 5. However, the invention is not limited to this, but setting of the IP access filter may be automatically performed by judgment of the control section C of the printing device PR1.

Figure 6:
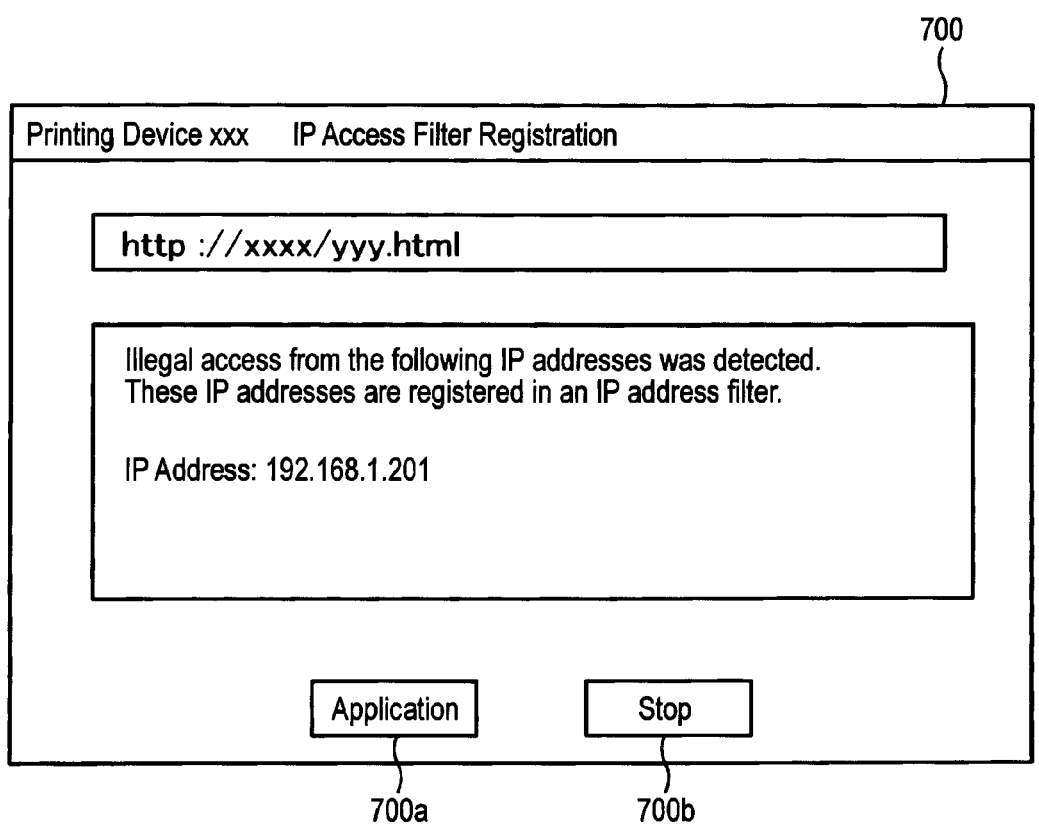
FIG. 6 is an explanatory view showing another constitutional example of the security setting page in the image forming system S1.

Namely, for example, as shown in FIG. 6, on a web page 700, a following notice may be given: "Illegal access from the following IP addresses was detected. This IP address is registered in an IP access filter. IP address: 192168.1.201"

In this case, also, the judgment by the administrator is required. In case that he has judged the above setting of the IP access filter to be applied, he clicks a "application" button 700a; and in case that he has judged such the setting to be unnecessary (in case that, for example, he judged the detection of the illegal access to be erroneous), he clicks a "stop" button 700b.

The control section C of the printing device PR1, on the basis of the administrator's final judgment as described above, makes setting of the IP access filter valid or invalid.

Next, with reference to FIGS. 7 to 10, an image forming system S2 and a printing device PR2 according to a second exemplary embodiment of the invention will be described.

Since the configuration of the image forming system S2 is the same as that of the image forming system S1 according to the first exemplary embodiment (refer to FIG. 1), its description is omitted.

Further, similarly to the case in the first exemplary embodiment, in the image forming system S2 according to the exemplary embodiment, one printing device PR2, one information processing device PC1, and one information processing device H are connected. However, the invention is not limited to this case, but two or more devices PR2, PC1, H may be connected. In addition, an image input device (scanner) having a network function may be connected.

Further, in the exemplary embodiment, the kind of printing device PR2 is not particularly limited, but may be any of a laser printer, a full-color printer, an ink jet printer, a scanner, and a multi function device.

Figure 7:
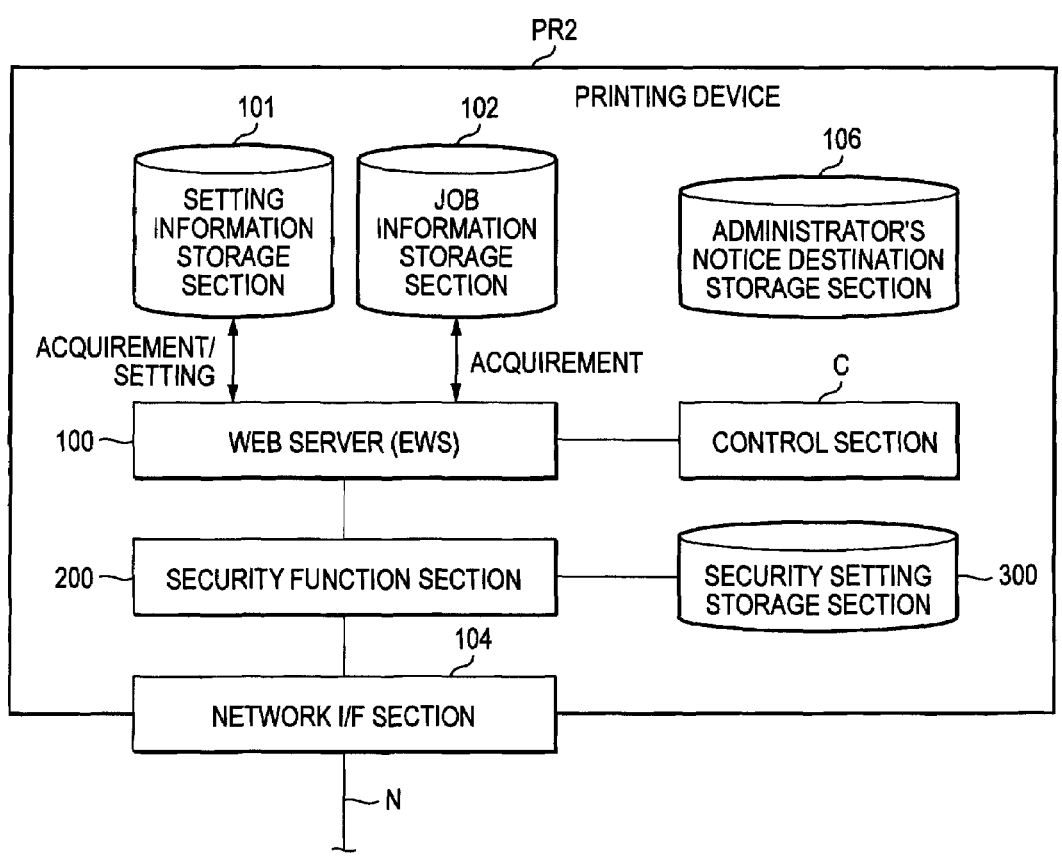
FIG. 7 is a block diagram showing a functional configuration of a printing device PR2.

Next, with reference to a block diagram of FIG. 7, the configuration of the printing device PR2 related to the invention will be described. Regarding the configuration related little to the invention, its illustration and description are omitted.

The printing device PR2 includes a control section C which including a microcomputer and controls the entirety of the device; an embedded web server (hereinafter, referred to as EMS) 100 as a request receiving section that performs various setting of the printing device PR2 itself, displays setting information, and displays printing job information; a setting information storage section 101 which stores various setting (setting of paper size, setting of resolution, setting of density, setting of two-sided printing, and setting of a staple) of the printing device PR2 itself; a job information storage section 102 which stores a printing job; a security function section 200 which sets, for a given IP address, a filter for permission and rejection of access to the EWS 100; a securing setting storage section 300 which stores security setting; a network interface section 104 which performs communication with the network N; and an administrator's notice destination storage section 106 which stores electronic mail address of an administration.

Next, a procedure of security setting change processing executed by the thus constructed image forming system S2 will be described with reference to a flowchart of FIG. 8 and an explanatory diagram of FIG. 9.

When this processing is started, first, whether illegal access has been detected is judged by control of the control section C in a step S200. In case of "No", the processing waits as it is; and in case of "Yes", the processing proceeds to a step S201 (refer to (1) in FIG. 9).

Here, though detection of the illegal access is not particularly limited, but it may be performed on the basis of input of an unauthorized password.

In the step S201, security is set by judgment of the control section C of the printing device PR2 (for example, a filter is set for "attacker's IP address", similarly to the case in the first exemplary embodiment), thereby to disenable setting of the printing device PR2 and reference of information, and thereafter, the processing proceeds to a step S202.

In the step S202, by the control of the control C of the printing device PR2, a web page for performing release of security setting is created.

Next, in a step S203, the printing device PR2 notifies the administrator's information processing device PC1 about URL of the web page for performing the release of security setting. This URL transmission may be performed by any of an electronic mail, SNMP-trap, and a given protocol.

Next, in a step S204, a link to the security release page is added to and displayed on a top page of the EWS 100 of the printing device PR2.

Figure 9:
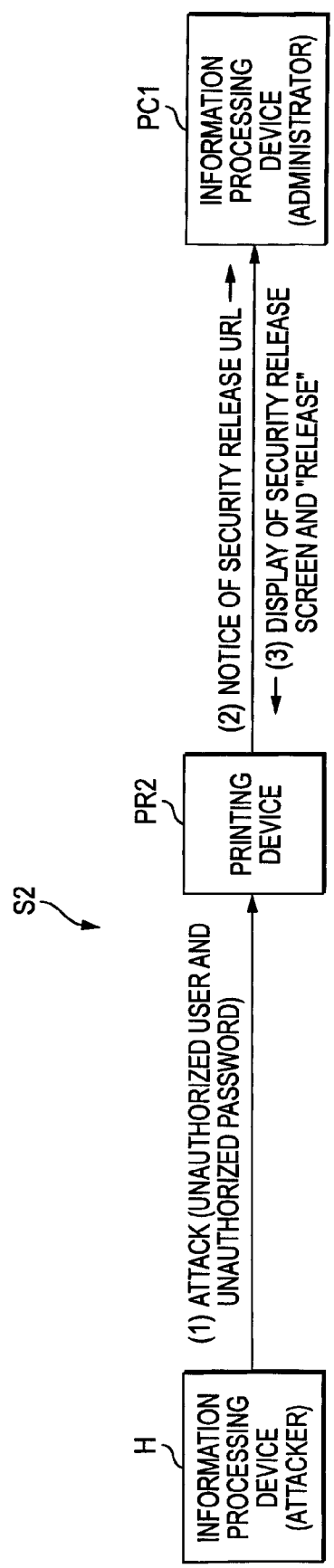
FIG. 9 is an explanatory view showing an operation of the image forming system S2.

In a step S205, the administrator operates a web browser of the information processing device PC1, thereby to gain access to the notified URL and open the security setting release page (refer to (3) in FIG. 9).

Figure 10:
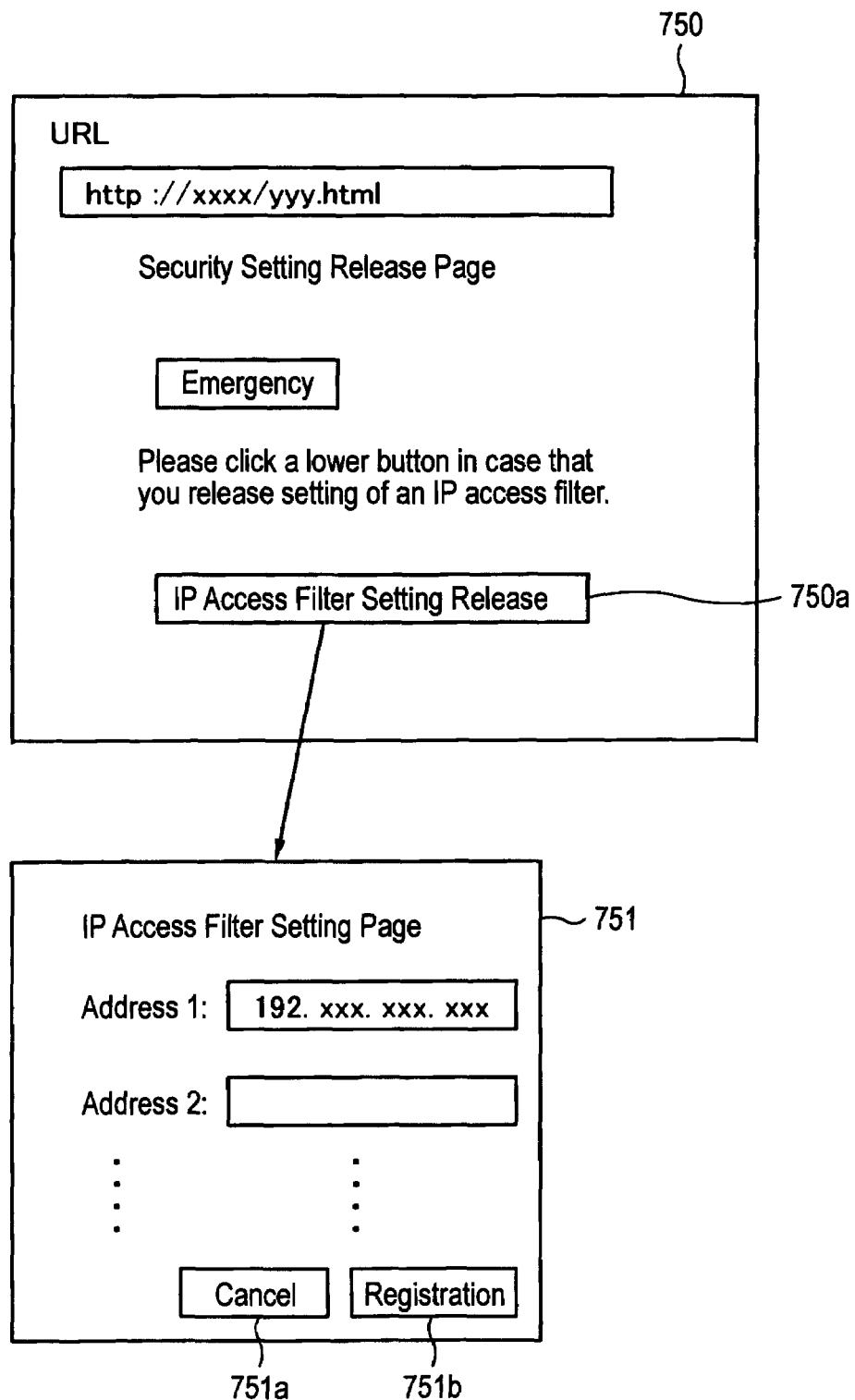
FIG. 10 is an explanatory view showing a constitutional example of a security setting release page in the image forming system S2.

A constitutional example of the security setting release page and an operation example are shown in FIG. 10.

A page 750 in FIG. 10 indicates a state where the link to the security release page is added to and displayed on the top page of the EWS 100. In this example, the link to a security IP access filter setting page is set in a button display 750a indicating "IP access filter setting release".

Here, the administrator, in case that he has judged release of the security setting to be necessary (for example, in case that it has confirmed that the detection of illegal access is erroneous), clicks the button display 750a by mouse operation.

Hereby, an IP access filter setting page 751 is opened, and the "IP address" already set is deleted by operation of a keyboard.

Figure 8:
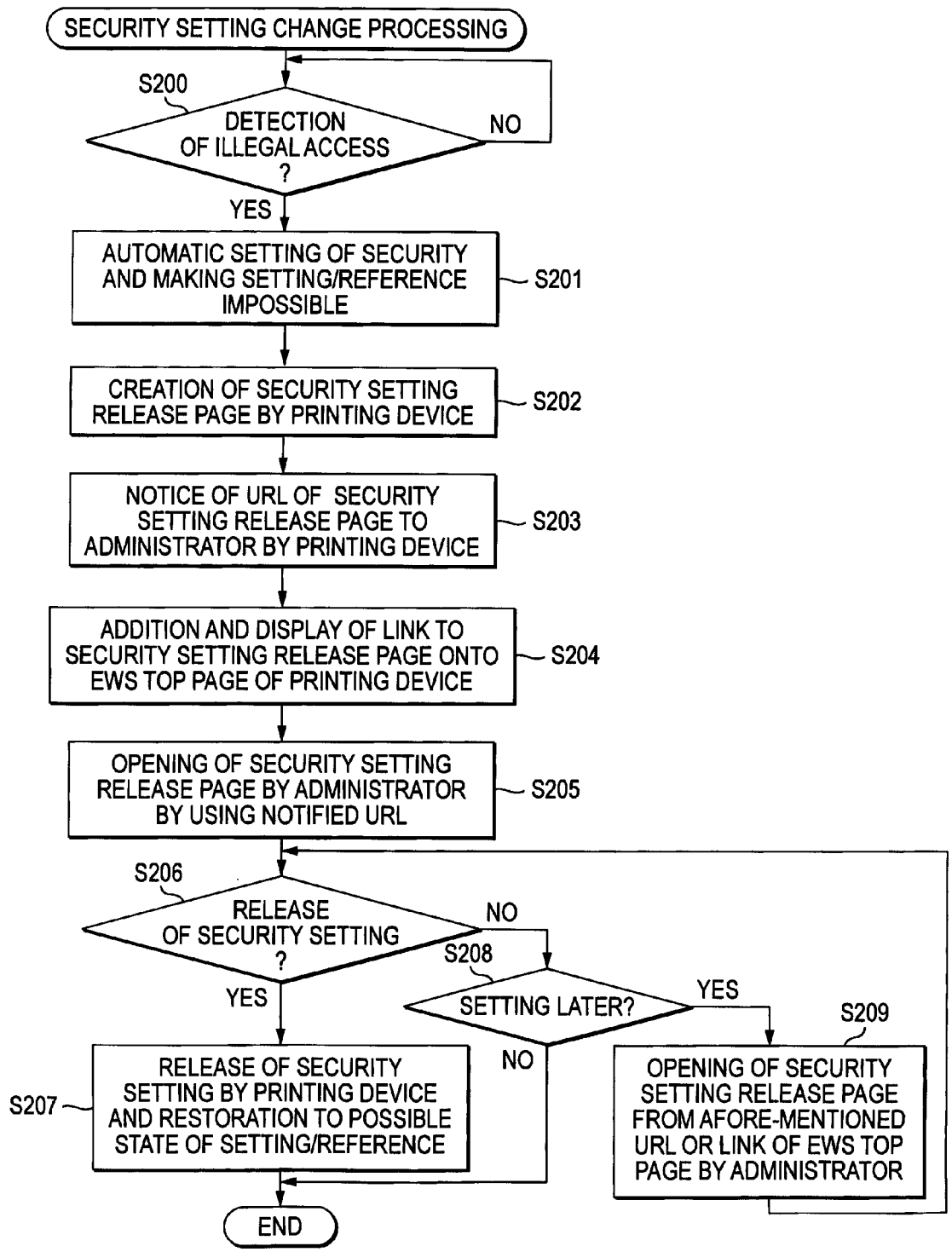
FIG. 8 is a flowchart showing a procedure of security setting change processing executed by an image forming system S2.

Next, in a step S206 in the flowchart of FIG. 8, whether securing setting is released or not is judged. In case of "No" (in the example of FIG. 10, in case that the security release is stopped by judgment of the administrator and a "cancel" button 751a is clicked), the processing proceeds to a step S208.

Further, in case of "Yes" (in the example of FIG. 10, in case that the inputted "IP address" is deleted as described, and a "registration" button 751b is clicked), the processing proceeds to a step S207.

In a step S207, the control section C of the printing device PR2 releases the filter on the basis of the setting contents of the IP access filter, and restores access to the EWS 100 from the information processing device H to a state where setting of the printing device PR2 from the printing device PR2 and reference of information are possible. Thereafter, the processing ends.

Hereby, for example, even in case that the administrator is absent, as soon as the illegal access has been detected, security setting is performed by the control of the control section C of the printing device PR2. Therefore, security of the printing device PR2 can be improved.

On the other hand, in case that it has been confirmed that the detection of the illegal access is erroneous (for example, in case that it has been confirmed that a person judged to be an attacker is a person having a valid access authorization), the security setting can be released by the simple procedure, so that a situation that convenience of the user of the printing device PR2 lowers can be avoided.

Further, steps S208 and S209 are compensative functions of enabling setting when the administrator, after judging the circumstances, has thought that the release of the security setting is required.

Further, in the above-mentioned example, though the administrator judges the circumstances and performs manually the release of IP access filter setting from the security setting release page as shown in FIG. 10, the invention is not limited to this but the release of the security setting may be more simply performed.

Figure 11:
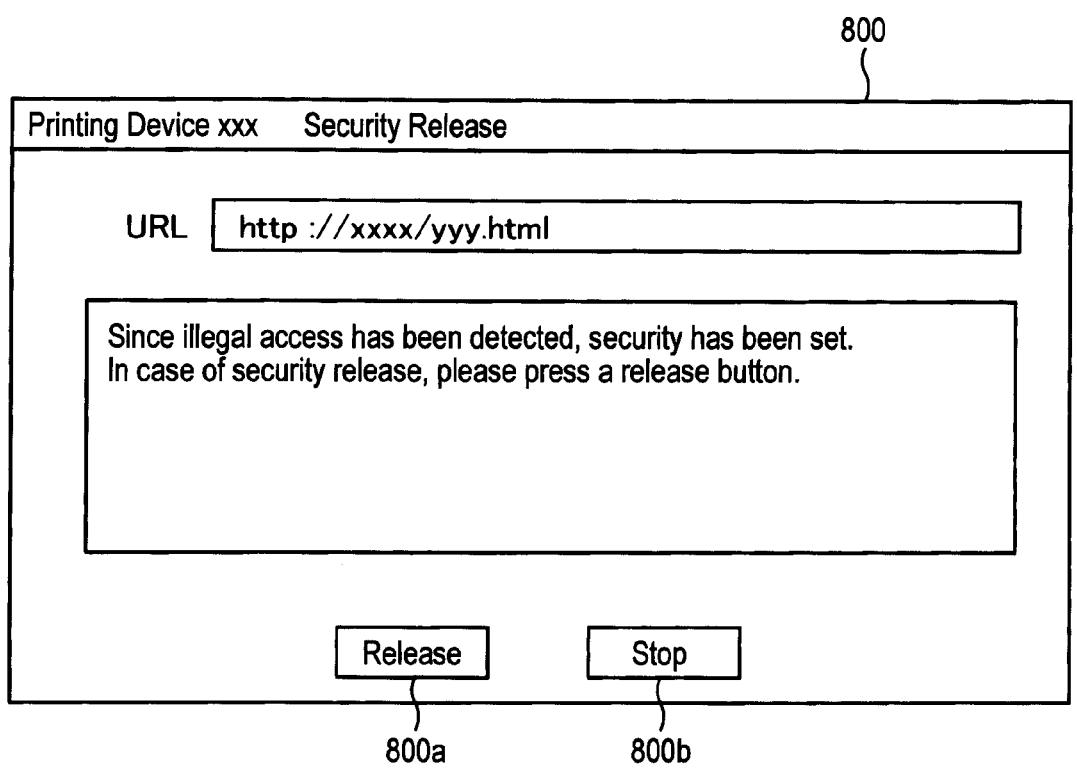
FIG. 11 is an explanatory view showing another constitutional example of the security setting release page in the image forming system S2.

Here, FIG. 11 shows a constitutional example of a web page for performing more simply the release of security setting.

On a web page 800 shown in FIG. 11, the following message is displayed: "Since illegal access has been detected, security has been set. In case of releasing the security, please press on a release button." The administrator, in case that he releases the security setting on the basis of his judgment of the circumstances (in case that it is confirmed that the detection of the illegal access is erroneous), clicks a "release" button 800a; and presses a "stop" button in case that he does not perform the release of the security setting.

Hereby, for example, even in case that the administrator is absent, as soon as the illegal access has been detected, the security setting is performed by the control of the control section C of the printing device PR2. Therefore, the security of the printing device PR2 can be improved.

On the other hand, in case that it has been confirmed that the detection of the illegal access is erroneous (for example, in case that it has been confirmed that a person judged to be an attacker is a person having a valid access authorization), the security setting may be quickly released by the simple procedure, so that a situation that convenience of the user of the printing device PR2 lowers can be avoided.

Next, with reference to FIGS. 12 to 18, an image forming system S3 and a printing device PR3 according to a third exemplary embodiment of the invention will be described.

Since the configuration of the image forming system S3 is the same as that of the image forming system S1 according to the first exemplary embodiment (refer to FIG. 1), its description is omitted.

Further, similarly to the case in the first exemplary embodiment, in the image forming system S3 according to the exemplary embodiment, one printing device PR3, one information processing device PC1, and one information processing device H are connected. However, the invention is not limited to this case, but two or more devices PR3, PC1, H may be connected. In addition, an image input device (scanner) having a network function may be connected.

Further, in the exemplary embodiment, the kind of printing device PR3 is not particularly limited, but may be any of a laser printer, a full-color printer, an ink jet printer, a scanner, and a digital copying machine.

Figure 12:
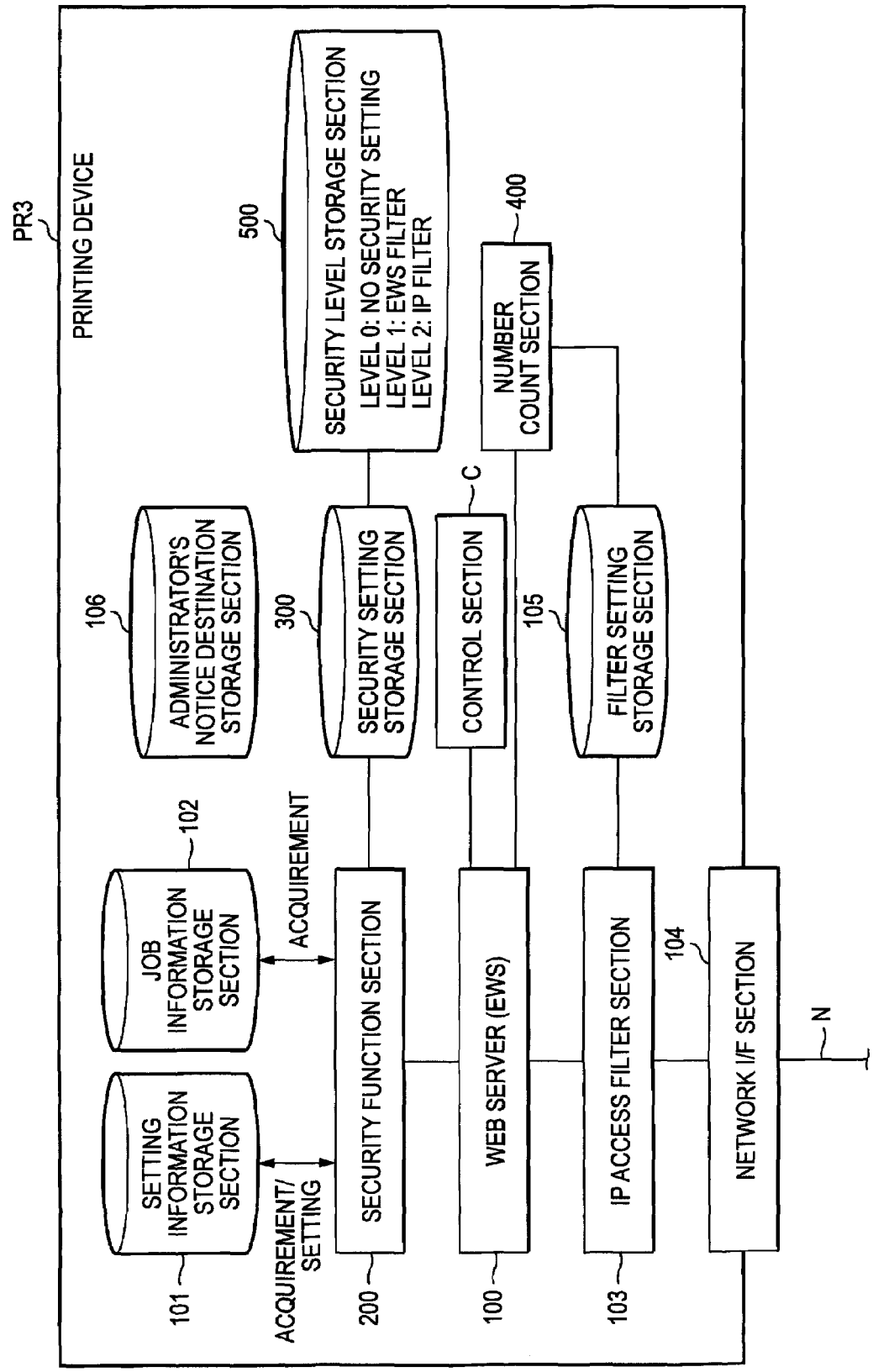
FIG. 12 is a block diagram showing a functional configuration of a printing device PR3.

Next, with reference to a block diagram of FIG. 12, the configuration of the printing device PR3 related to the invention will be described. Regarding the configuration related little to the invention, its illustration and description are omitted.

The printing device PR3 includes a control section C which includes a microcomputer and controls the entirety of the device; an embedded web server (hereinafter, referred to as EWS) 100 as a request receiving section that performs various setting of the printing device PR3 itself, displays setting information, and displays printing job information; a setting information storage section 101 which stores various setting (setting of paper size, setting of resolution, setting of density, setting of two-sided printing, and setting of a staple) of the printing device PR3 itself; a job information storage section 102 which stores a printing job; a security function section 200 which sets, for a given IP address, a filter for permission and rejection of access to the EWS 100; a security setting storage section 300 which stores security setting; an IP access filter section 103 which sets, for a given IP address, a filter for permission and rejection of access to the EWS 100; a network interface section 104 which performs communication with the network N; a filter setting storage section 105 which stores setting of the filter; an administrator's notice destination storage section 106 which stores electronic mail address of an administrator; a number count section 400 which counts the number of illegal accesses; and a security level storage section 500 which stores security setting in accordance with a security level.

Figure 13:
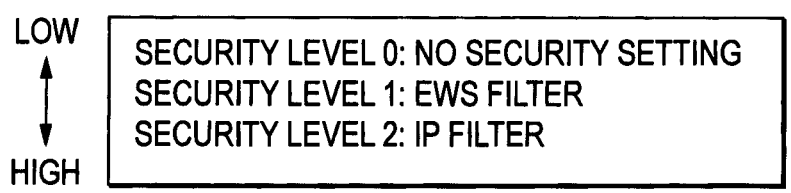
FIG. 13 is an explanatory view showing contents of security level in an image forming system S3.

In the security level storage section 500, for example, as shown in FIG. 13, a table in which three levels 0 to 3 of security are set is stored.

A security level 0 indicates "no setting of security".

A security level 1 indicates setting of "EMS filter (which is a filter that rejects access by a web browser and has such setting contents as to permit, for example, printing processing).

A security level 2 indicates setting of "IP access filter (which is a filter that rejects all accesses and has such setting contents as to reject all processing including printing processing).

In the example of FIG. 13, the security increases in order from the security level 0, the security level 1 and the security level 2.

Setting corresponding to the security level is not limited to the example shown in FIG. 13. For example, such settings are thought that the EWS 100 itself is made off, and that the processing contents are divided into printing contents and management contents, and permission/rejection of the printing contents and the management contents are respectively set in accordance with the security level.

Next, a procedure of security setting change processing executed by the thus constructed image forming system S3 will be described with reference to a flowchart of FIG. 14 and an explanatory diagram of FIG. 15.

When this processing is started, first, whether illegal access has been detected is judged by control of the control section C in a step S299. In case of "No", the processing waits as it is; and in case of "Yes", the processing proceeds to a step S300 (refer to (1) in FIG. 15).

Here, the detection of the illegal access is not particularly limited. For example, the detection may be judged as follows: in case that the number of inputs of an unauthorized password counted by the number count section 400 exceeds a given threshold, the illegal access is judged to exist.

In the step S300, the security level is automatically set to the "level 1" (refer to FIG. 13) by the control of the control section C of the printing device PR3, thereby to make setting of the EWS 100 and reference of administrator's information impossible. Thereafter, the processing proceeds to a step S301.

In the step S301, a web page for performing security setting and URL of its web page are created by the control of the control section C of the printing device PR3.

Figure 15:
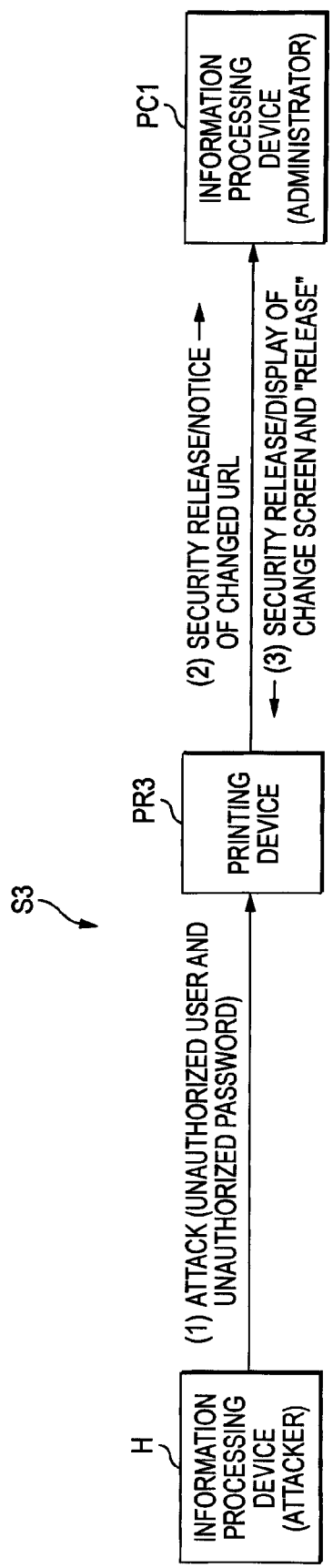
FIG. 15 is an explanatory view showing an operation of the image forming system S3.

Next, in a step S302, the URL of the web page for performing security setting of the printing device PR3 is notified to the information processing device PC1 of the administrator (refer to (2) in FIG. 15). This URL transmission may be performed by any of an electronic mail, SNMP-trap and a given protocol.

Next, in a step S303, the administrator operates the web browser of the information processing device PC1, gains access to the notified URL, and opens a security setting page.

Here, with reference to FIG. 16, a constitutional example of a security setting page 900 will be described.

In the securing setting page 900, there is displayed, for example, a message of "Since illegal access from the following IP address is detected at the present, security (level 1) is set."

Further, below this message, the detected IP address and the number of accesses are displayed, and each IP address can be selected by pressing a check box (refer to 900a and 900b in FIG. 16).

Further, below the check box, a message is displayed as follows: "Please register either IP address in an IP access filter, and please press a registration button in enhancement of the security (level 2).

In release of the security, please press a release button."

Further, below this message, a registration button 900c, a release button 900d, re-notice button 900e, and a stop button 900f are disposed.

The re-notice button 900e is used to recreate a web page on the printing device PR3 side on the basis of administrator's judgment in order to confirm the latest information (number of accesses) and to give again URL notice. The stop button 900f is operated in case that processing is ended on the basis of administrator's judgment without performing change of setting (for example, change of the security level).

Figure 14:
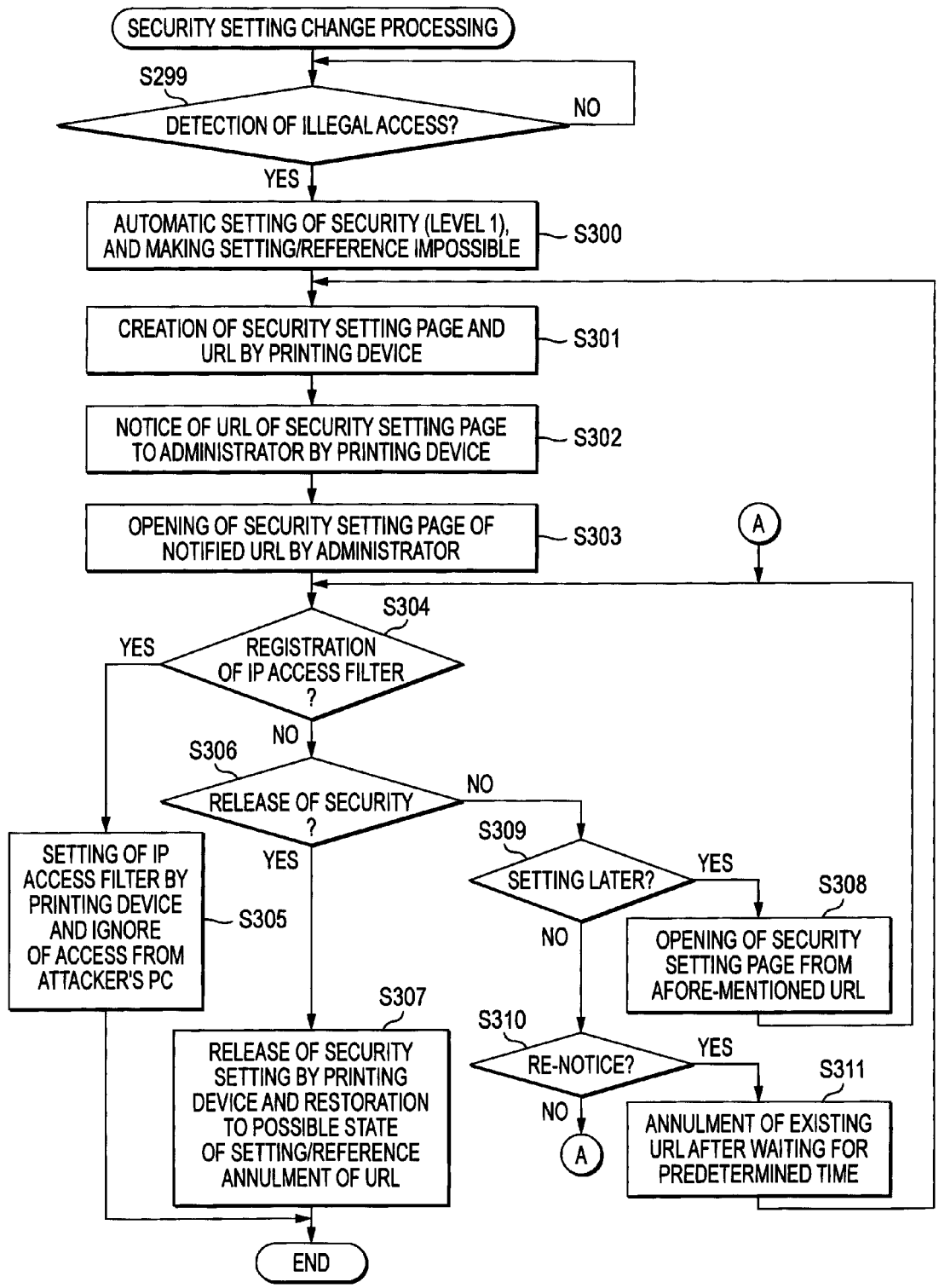
FIG. 14 is a flowchart showing a procedure of security setting change processing executed by the image forming system S3.

In a step S304 in the flowchart of FIG. 14, whether the IP access filter is registered or not is judged.

Figure 16:
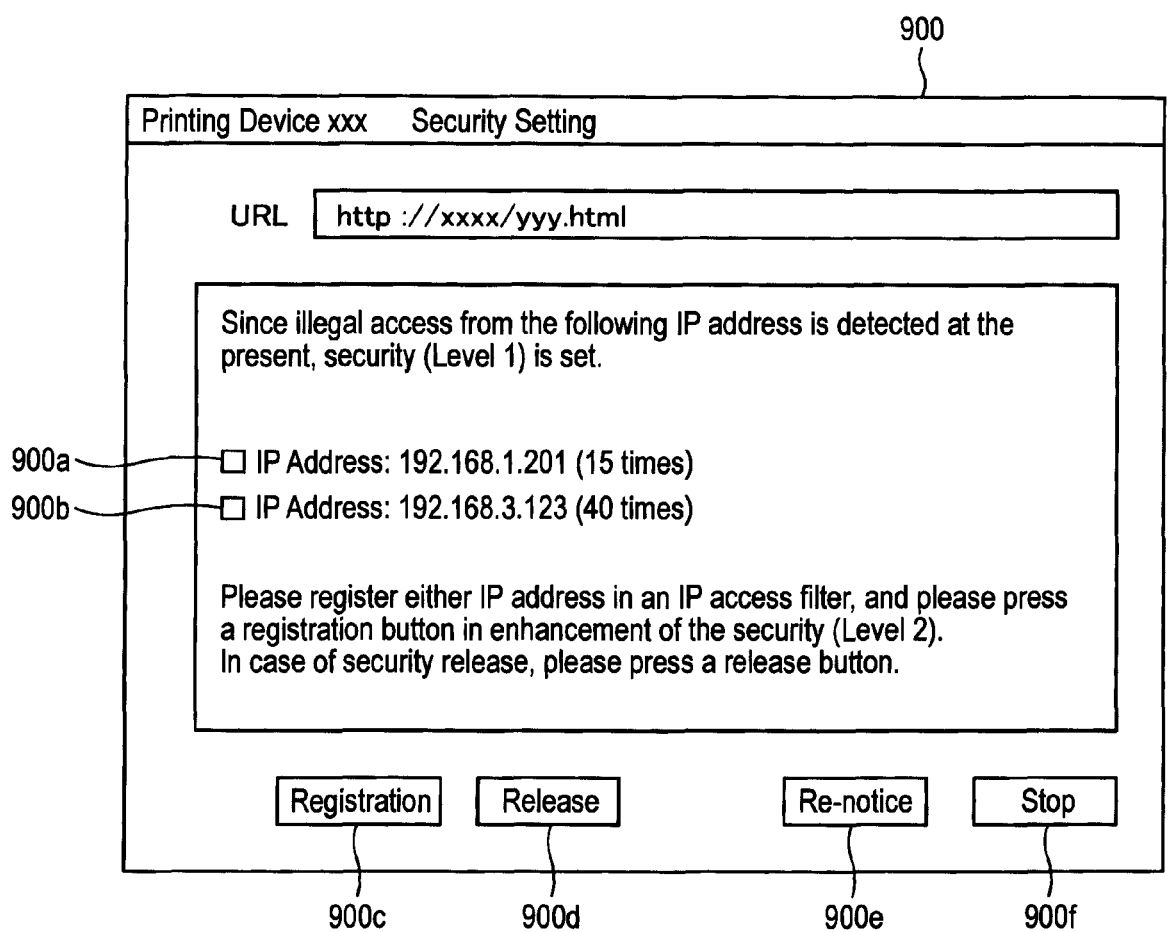
FIG. 16 is an explanatory view showing a constitutional example of a security setting page in the image forming system S3.

Namely, in the example shown in FIG. 16, by administrator's operation of the web browser, at least one of the check boxs 900a and 900b is selected on the web page 900, the registration button 900c is clicked, and whether the security level is shifted to the level 2 (refer to FIG. 13) or not is judged.

In case that a judgment result is "Yes" (in case that the security level is shifted to the "level 2"), the processing proceeds to a step S305, in which the printing device PR3 sets the selected IP access filter and operates so as to ignores access to the printing device PR3 from attacker's information processing device H (to reject all accesses including the setting of the printing device PR3 and utilization of printing processing). Thereafter, the processing proceeds to a step S307 and then the processing ends.

On the other hand, in case that the judgment result is "No" in the step S304, the processing proceeds to a step S306, in which whether the security is released (whether the release button 900d has been clicked) or not is judged.

In case of "Yes", the processing proceeds to the step S307, in which the printing device PR3 releases the security setting on the given IP address (sets the security level to the "level 0"), the printing device PR 3 is restored to a state where setting of the printing device PR3 and reference of administrator's information are possible, and the existing URL is annulled. Thereafter, the processing ends. Hereby, it is possible to avoid such a situation that the third person uses this URL evilly after setting of the security thereby to change illegally the security level of the printing device PR3.

Further, in case that the result of the judgment in step S306 is "No", processing in steps S309 and S310 are performed. These steps S309 and S310 are compensative functions of enabling setting when the administrator has thought that change of security setting is required after judging the circumstances.

In a step S311, in case that the URL notice is given again in the step S310 (in case that re-notice button 900e has been clicked), the existing URL is annulled after waiting for a fixed time, and the processing returns to the step S301 to perform the similar processing.

Further, in a step S308, in case that security setting is performed on the basis of administrator's judgment, the security setting page 900 is opened, and the processing proceeds to the step S304 to perform the above-mentioned processing.

According to the exemplary embodiment, even in case that the administrator of the information processing device PC1 is absent, the printing device PR3 itself performs automatically change in contents of access limitation (for example, such change to enhance security level). Therefore, the security of the printing device PR 3 can be further improved.

Figure 17:
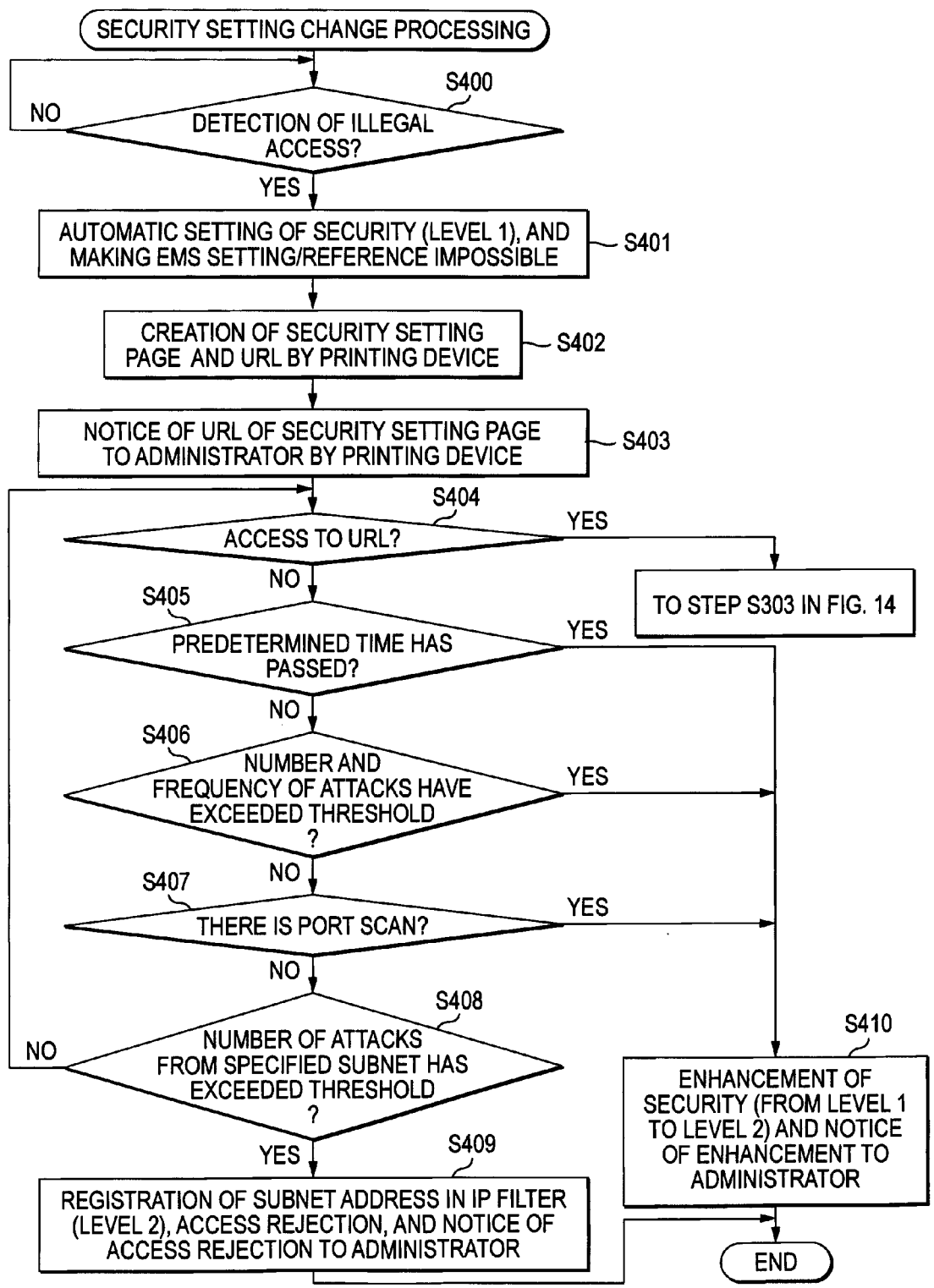
FIG. 17 is a flowchart showing a procedure of another security setting change processing executed by the image forming system S3.

Next, a procedure of another security setting change processing executed by the image forming system S3 will be described with reference to a flowchart of FIG. 17 and an explanatory diagram of FIG. 18. A part of this processing is the same as the processing shown in the flowchart of FIG. 14.

When this processing is started, whether illegal access has been detected is judged by control of the control section C in a step S400. In case of "No", the processing waits as it is; and in case of "Yes", the processing proceeds to a step S401 (refer to (1) in FIG. 18).

Here, though detection of the illegal access is not particularly limited, the detection may be judged as follows; in case that the number of inputs of the unauthorized password exceeds a predetermined threshold, the illegal access is judged to exist.

In the step S401, the security level is automatically set to the "level 1" (refer to FIG. 13) by the control of the control section C of the printing device PR3, thereby to make setting of the EWS 100 and reference of administrator's information impossible. Thereafter, the processing proceeds to a step S402.

In the step S402, a web page for performing security setting and URL of its web page are created by the control of the control section C of the printing device PR3.

Next, in a step S403, the URL of the web page for performing security setting of the printing device PR3 is notified to the information processing device PC1 of the administrator (refer to (2) in FIG. 18). This URL transmission may be performed by any of an electronic mail, SNMP-trap and a given protocol.

Next, in a step S404, by administrator's operation of a web browser of the information processing device PC1, whether the information processing device PC1 accessed to the webpage having the transmitted URL or not is judged. In case of "Yes", the processing proceeds to the step S303 in the flowchart of FIG. 14 and the similar processing is executed.

On the other hand, in the step S404, in case that the judgment result is "No", the processing proceeds to a step S405, in which whether a given time (for example, thirty minutes) has passed is judged. In case of "Yes", the processing proceeds to a step S410, in which the security level is raised from the "level 1" to the "level 2" by the control of the control section C of the printing device PR3, and its fact is notified to the administrator by using such as an electronic mail. Thereafter, the processing ends.

Hereby, even in case that the administrator of the information processing device PC1 is absent, the printing device PR3 itself performs automatically change in contents of access limitation (for example, such change to enhance security level) after the given time has passed. Therefore, security property of the printing device PR 3 can be further improved.

Further, since the state of the security level has been notified to the administrator, he can increase the security level according to necessity or can release security setting, so that he can perform the security setting according to the circumstances.

Further, in case of "No" in the step S405, the processing proceeds to a step S406, in which whether the number of attacks (number of illegal accesses) or attack frequency exceeds a given threshold is judged. In case of "Yes", the processing proceeds to a step S410, in which the security level is increased from the "level 1" to the "level 2" by the control of the control section C of the printing device PR3, and its fact is notified to the administrator by using such as an electronic mail. Thereafter, the processing ends.

Hereby, even in case that the administrator of the information processing device PC1 is absent, when the attack on the printing device PR3 is sever, the printing device PR3 itself performs automatically change in contents of access limitation (for example, such change to enhance security level). Therefore, the security of the printing device PR 3 can be further improved.

Further, since the state of the security level has been notified to the administrator, he can increase the security level according to necessity or can release security setting, so that he may perform the security setting according to the circumstances.

Further, in case of "No" in the step S406, the processing proceeds to a step S407, in which whether a port scan was executed or not is judged.

Here, the port scan means act of gaining access to the printing device PR3 through the network N continuously to search a weak point on security (security hole).

In case that the judgment result is "Yes" in the S406, the processing proceeds to a step S410, in which the security level is increased from the "level 1" to the "level 2" by the control of the control section C of the printing device PR3, and its fact is notified to the administrator by using such as an electronic mail. Thereafter, the processing ends.

Hereby, even in case that the administrator of the information processing device PC1 is absent, when it is judged that the attack on the printing device PR3 includes the port scan and is very vicious, the printing device PR3 itself performs automatically change in contents of access limitation (for example, such change to enhance security level). Therefore, the security of the printing device PR 3 can be further improved.

Further, since the state of the security level has been notified to the administrator, he can increase further the security level according to necessity or can release security setting, so that he can perform the security setting according to the circumstances.

Further, in case of "No" in the step S407, the processing proceeds to a step S408, in which whether the number of attacks from a specified subnet (number of total attacks using plural addresses) exceeds a given threshold is judged. In case of "Yes", the processing proceeds to a step S409, in which a subnet address is registered in the IP address filer (namely, the security level is increased to the level "2"), and after making setting of rejecting all accesses, its fact is notified to the administrator by using such as an electronic mail. Thereafter, the processing ends.

Hereby, even in case that the administrator of the information processing device PC1 is absent, when the attack on the printing device PR3 is severe, the printing device PR3 itself performs automatically change in contents of access limitation (for example, such change to enhance security level). Therefore, the security of the printing device PR 3 can be further improved.

Further, since the state of the security level has been notified to the administrator, he can increase further the security level according to necessity or can release security setting, so that he can perform the security setting according to the circumstances.

Although the invention made by the inventor has been concretely described above with reference to the exemplary embodiments, it is to be understood that the exemplary embodiments disclosed in this specification are illustrative in all points and not limited to the disclosed technology. Namely, the technical scope of the invention should not be interpreted restrictively on the basis of the description of the aforesaid exemplary embodiments, but should be interpreted in accordance with the description of the claims, and includes technology equivalent to the technology described in the claims and all changes within the claims.

Further, in case that a program is used, it may be provided through a network, or provided in a storage state in a recording medium such as CD-ROM.

The information forming device, the information forming system, and the information forming program according to the invention may be applied to a system using a laser printer, a full-color printer, a facsimile device, a scanner, or a digital multifunctional machine.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming device comprising:
   an image forming section that performs image formation on a medium;
   a connection section that communicates with an information processing device;
   a request receiving section that receives a request from the information processing device through the connection section, the request receiving section being an embedded web server through which the information processing device accesses the image forming device;
   an illegality detection section that determines whether the request is an illegal access request;
   a notice section that notifies an administrator that the illegal access request is detected by the illegality detection section;
   a limitation section that rejects the request and blocks access to the embedded web server from the information processing device, based on the illegality detection section determining the request to be the illegal access request; and
   a web page creation section that creates a web page indicating that the illegal access request is detected,
   wherein the embedded web server provides the web page, and
   wherein the notice section transmits a uniform resource locator (URL) of the web page created by the web page creation section through the connection section to the administrator by using one of an electronic mail, SNMP-trap, and a certain protocol,
   wherein the web page includes an interface enabling the administrator to set at least one of an Internet Protocol (IP) access filter on an IP address of the information processing device, IPsec and SSL.

2. The image forming device according to claim 1, wherein the request receiving section includes a storage section which stores at least one of information relating to operational settings of the image forming device and user information relating to the image forming device, and
   in response to the illegality detection section determining that the request from the information processing device is not the illegal access request, the information stored in the storage section is provided through the embedded web server.

3. The image forming device according to claim 1, wherein the illegality detection section detects an Internet Protocol (IP) address of the information processing device; and
the web page creation section creates the web page to include the IP address of the information processing device.

4. The image forming device according to claim 3, wherein the notice section transmits the IP address to the administrator by using one of an electronic mail, SNMP-trap and a predetermined protocol.

5. The image forming device according to claim 1, wherein the web page includes an interface enabling the administrator to block the illegal access request from the information processing device.

6. The image forming device according to claim 5, wherein the URL of the webpage is invalidated when the administrator accesses the web page.

7. The image forming device according to claim 1, wherein the limitation section blocks the access to the embedded web server, based on an instruction.

8. The image forming device according to claim 1, wherein the limitation section blocks access to printing operations of the image forming device, based on an instruction.

9. The image forming device according to claim 8, further comprising:
an authentication section that authenticates the request,
wherein the information processing device accesses the image forming device in response to the authentication section authenticating the request.

10. The image forming device according to claim 1, further comprising:
a level setting section that sets a security level,
wherein the limitation section blocks the access to the embedded web server using the security level.

11. The image forming device according to claim 10, wherein the security level disables the embedded web server.

12. The image forming device according to claim 1, wherein the illegality detection section includes a count section that counts a number of illegal accesses; and
the web page creation section creates the web page to include the number of illegal accesses obtained by the count section.

13. The image forming device according to claim 12, further comprising:
a threshold setting section that sets a given threshold of a number of illegal accesses; and
a comparison section that compares a count result by the count section with the given threshold,
wherein the limitation section blocks access to printing operations of the image forming device in accordance with a comparison result by the comparison section.

14. The image forming device according to claim 1, further comprising:
the connection section that includes a count section which counts a number of illegal access from a specified subnet; and
a threshold setting section that sets a given threshold of the number of illegal access; and
a comparison section that compares a count result by the count section with the given threshold,
wherein the limitation section blocks access to printing operations of the image forming device in accordance with a comparison result by the comparison section.

15. The image forming device according to claim 1, wherein when the administrator does not access the web page within a period of time, (i) the URL of the web page is invalidated, (ii) the web page creation section a new web page and (iii) the notice section transmits a new URL of the new web page to the administrator.

16. The image forming device according to claim 1, wherein the notice section transmits the URL of the web page in a given encryption or compression form.

17. An image forming system comprising:
a plurality of image forming devices of claim 1;
a plurality of image processing devices; and
a communication section that connects each image forming device and each image processing device.

18. An image forming device comprising:
an image forming section that performs image formation on a medium;
a connection section that communicates with an information processing device;
a request receiving section that receives a request from the information processing device through the connection section the request receiving section being an embedded web server through which the information processing device accesses the image forming device;
an illegality detection section that determines whether the request is an illegal access request;
a notice section that notifies an administrator that the illegal access request is detected by the illegality detection section;
a limitation section that rejects the request and blocks access to the embedded web server from the information processing device, based on the illegality detection section determining the request to be the illegal access request;
a web page creation section that creates a web page indicating that the illegal access request is detected; and
a level setting section that sets a security level;
wherein the limitation section blocks the access to the embedded web server using the security level,
wherein the embedded web server provides the web page,
wherein the notice section transmits a uniform resource locator (URL) of the web page created by the web page creation section through the connection section to the administrator by using one of an electronic mail, SNMP-trap, and a certain protocol, and
wherein the web page includes an interface enabling the administrator to block the access to the embedded web server using the security level.

19. The image forming device according to claim 18, further comprising:
a control section that determines whether the administrator accesses the web page within a predetermined period of time and controls, when the web page is not accessed within the period of time, the limitation section to block access to printing operations of the image forming device from the information processing device.

* * * * *